United States Patent
Olde Heuvel

(12) 
(10) Patent No.: US 6,588,550 B1
(45) Date of Patent: Jul. 8, 2003

(54) SELF-CENTRING BRAKE DEVICE

(76) Inventor: Bernardus Johannes Maria Olde Heuvel, Ganzenbree 11, NL-7482 LD Haaksbergen (NL)

( * ) Notice: Subject to any disclaimer, the term of this patent is extended or adjusted under 35 U.S.C. 154(b) by 0 days.

(21) Appl. No.: 09/869,253
(22) PCT Filed: Dec. 13, 1999
(86) PCT No.: PCT/NL99/00766
§ 371 (c)(1),
(2), (4) Date: Sep. 26, 2001
(87) PCT Pub. No.: WO00/40455
PCT Pub. Date: Jul. 13, 2000

(30) Foreign Application Priority Data

Dec. 30, 1998 (NL) .............................. 1010929

(51) Int. Cl.⁷ ................................. B62L 3/00
(52) U.S. Cl. .................... 188/24.22; 74/502.4
(58) Field of Search .......... 188/24.19, 24.22, 188/2 D, 24.11; 74/502.4, 502.6

(56) References Cited

U.S. PATENT DOCUMENTS

| | | | |
|---|---|---|---|
| 4,141,117 A | * 2/1979 | Van Gompel | 24/136 A |
| 4,717,004 A | * 1/1988 | Hoyle | 188/2 D |
| 5,501,301 A | * 3/1996 | Nishimura | 188/24.12 |
| 5,503,252 A | * 4/1996 | Gelbein | 188/24.19 |
| 6,257,375 B1 | * 7/2001 | Tseng | 188/24.12 |
| 6,264,008 B1 | * 7/2001 | Jordan et al. | 188/24.19 |

FOREIGN PATENT DOCUMENTS

| | | | |
|---|---|---|---|
| DE | 3433568 | | 4/1985 |
| DE | 9307514.6 | | 9/1993 |
| DE | 628473 A1 | * | 12/1994 |
| DE | 4328758 | | 3/1995 |
| FR | 2621090 A1 | * | 3/1989 |

* cited by examiner

Primary Examiner—Christopher P. Schwartz
Assistant Examiner—Xuan Lan Nguyen
(74) Attorney, Agent, or Firm—Webb Ziesenheim Logsdon Orkin & Hanson, P.C.

(57) ABSTRACT

The invention relates to a brake device for braking a movement of an object by mechanical friction, such as the movement of rails relative to a train, or the rotation of a brake disc or a cycle wheel. The brake device has a basic part with an engagement point for engagement of a braking force which can be exerted via an operator; a brake block arranged on the basic part for braking the movement of the object by friction, wherein the basic part is movable such that the brake block is movable with at least a substantial transverse component relative to the movement of the object; resetting spring means for urging the brake block away from the object to a free rest position such that in the case of a braking force smaller than the spring force a space results between the object and the brake block; a first and a second stop, which stops are arranged at a fixed mutual distance, which first stop determines the maximum distance between the object and the brake block, and which second stop adjusts itself to the contact position, i.e. the position wherein brake block and object make mutual contact, when a braking force is exerted which exceeds the spring force.

6 Claims, 3 Drawing Sheets

SELF-CENTRING BRAKE DEVICE

BACKGROUND OF THE INVENTION

1. Field of the Invention

The invention relates to a brake device for braking a movement of an object by mechanical friction, such as the movement of rails relative to a train, or the rotation of a brake disc or a cycle wheel, which brake device comprises:

- a basic part with an engagement point for engagement of a braking force which can be exerted via operating means;
- a brake block arranged on the basic part for braking the movement of the object by friction, wherein the basic part is movable such that the brake block is movable with at least a substantial transverse component relative to the movement of the object;
- resetting spring means for urging the brake block away from the object to a free rest position such that in the case of a braking force smaller than the spring force a space results between the object and the brake block.

2. Brief Description of the Prior Art

A drawback of the existing brake devices is that due to fouling of the pivot points of the brake device the distance from the brake block to the object for braking is not constant. The braking action is adversely affected hereby. When the distance from the brake block to the object for braking is not constant, the path of the braking force is therefore not constant. This is noticeable in for instance the brake pedal or the brake handle.

When a stop is provided against which the basic part lies in rest position, there is still the drawback that the distance between brake block an d the object for braking is uncertain. This is the result of wear of the brake block. The further problem can arise that although the distance between brake block and object for braking is certain, there is an uncertain play in for instance the brake cable.

SUMMARY OF THE INVENTION

The above stated drawbacks are prevented according to the present invention, which is characterized by:

- a first and a second stop, which stops are arranged at a fixed mutual distance, which first stop determines the maximum distance between the object and the brake block, and which second stop adjusts itself to the contact position, i.e. the position wherein brake block and object make mutual contact, when a braking force is exerted which exceeds the spring force.

The clearance between the brake block and object for braking is determined by the first and second stop. When now the brake block wears, the clearance would become greater. This is obviated according to the invention in that the second stop adjusts itself to the contact position, i.e. the position wherein brake block and object make mutual contact, when a braking force is exerted which exceeds the spring force. The first stop is herein also adjusted in that the stops have been arranged at a fixed mutual distance. Adjusting means can preferably be provided for adjusting the fixed distance between the stops.

A preferred embodiment of the invention comprises:

- a first friction part arranged slidably on the basic part;
- a second friction part which is pressed under spring load against the first friction part;
- wherein both stops are connected to the second friction part.

The adjustment of the two stops is effected in simple manner by the two friction parts. An efficient adjustment can be obtained by setting the spring load.

The friction parts are preferably disc-shaped.

In yet another embodiment according to the invention both stops are formed as the end surfaces of a slot arranged in the second friction part or the basic part and a pin which extends in the slot, is arranged on the basic part respectively on the second friction part and co-acts with these respective end surfaces.

The advantage hereof is that a compact, simple and effective embodiment is obtained.

The invention further relates to a cycle brake for braking a wheel arranged rotatably in a fork, which cycle brake comprises two brake devices, each arranged on an arm of the fork on either side of the wheel, wherein the first friction parts are arranged fixedly on the fork, wherein the brake locks engage on the cycle wheel and wherein the resetting spring means are arranged between the basic parts.

The advantage of the above stated cycle brake is that the brake blocks are always arranged with a fixed clearance relative to the wheel rim. A reliable and predictable braking action is hereby obtained. Furthermore, the braking force is evenly distributed over both sides of the rim, whereby a uniform wear of the brake block is obtained. This enhances safety, since the braking action is always reliable.

Another advantage of the cycle brake according to the invention is that, particularly in the case of cycle races, a wheel can be replaced quickly without the brake having to be readjusted.

In yet another preferred embodiment of the invention the engagement point for engaging a braking force comprises a device for eliminating play between a bowden cable and the basic part, which device comprises:

- a first cylindrical bush,
- a second cylindrical bush placed slidably in the first cylindrical bush, to which second bush the outer casing of the bowden cable is coupled so as to be resistant to compression and tensile strain and through which the inner cable runs, wherein the second bush comprises on the outside a recess which together with the outer bush bounds a wedge-shaped space;
- at least one ball placed in the groove for blocking by wedging action the sliding movement of the second bush relative to the first bush in an axial direction.

When a brake is sought wherein the clearance between brake block and the object for braking is always constant, it is likewise important to preclude play in other parts of the brake system. Wear does for instance occur in the case of a bowden cable whereby play will occur in the cable. Such a cable will moreover have to be readjusted when the brake block becomes worn. The invention therefore provides the above stated adjusting device.

In yet another embodiment according to the invention the device for eliminating play comprises a third cylindrical bush placed slidably between the first and the second bush for engagement on the at least one ball, in order to discontinue the blocking action as desired.

The inner cable can hereby be displaced in simple manner in both directions relative to the outer cable of the bowden cable, whereby the distance between brake block and the object for braking can be increased, which may be desired when the brake blocks are replaced or when the object for braking is replaced. As soon as the brake device is operated again, the fixed clearance between brake block and object for braking is set once again.

BRIEF DESCRIPTION OF THE DRAWINGS

These and other features of the invention will be further elucidated with reference to the annexed drawings.

DETAILED DESCRIPTION OF THE PREFERRED EMBODIMENTS

Figure 1:
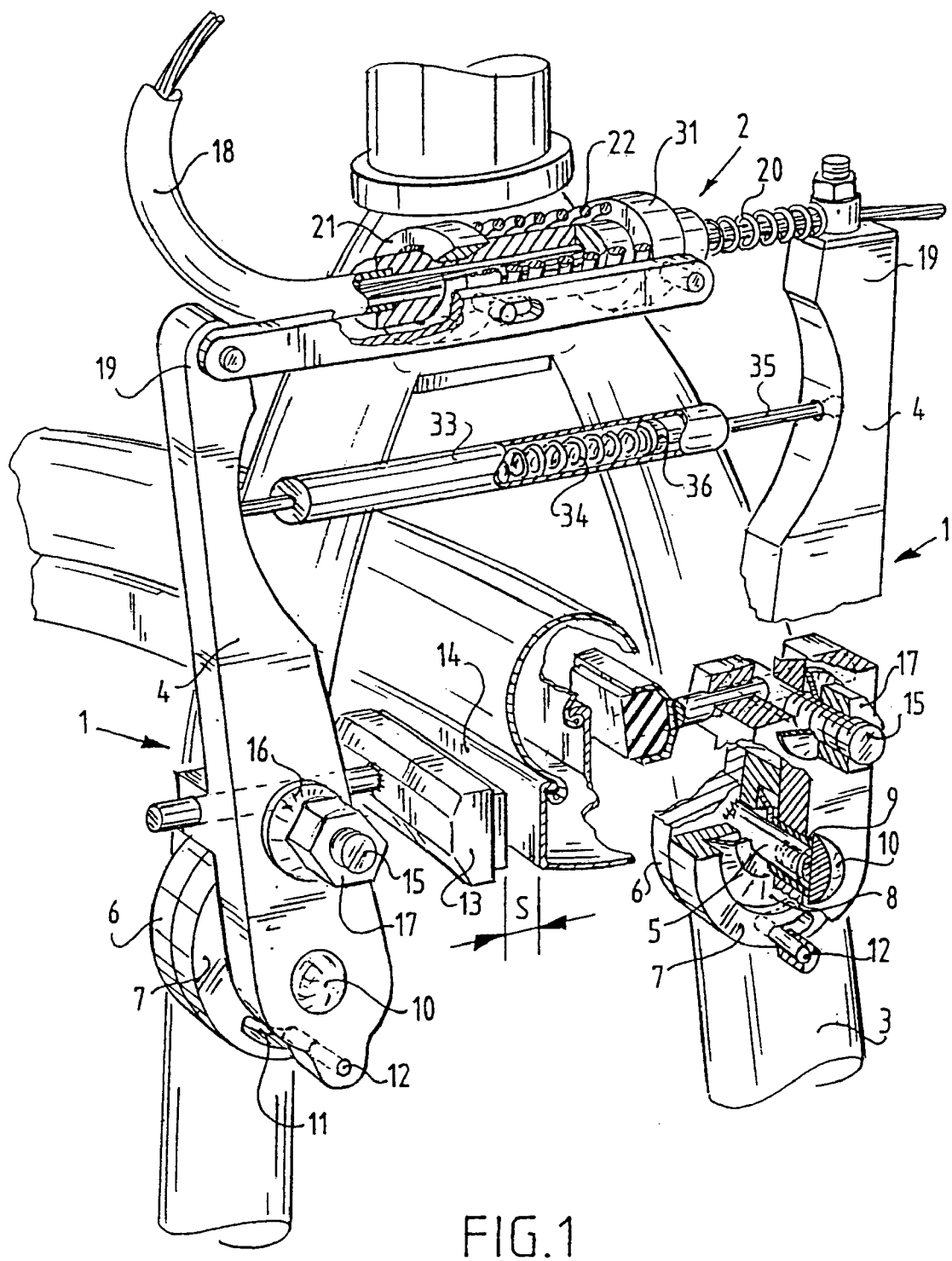
FIG. 1 shows a perspective view of a brake device according to the invention.

FIG. 1 shows a cycle brake comprising brake devices 1 according to the invention and an adjusting device 2 according to the invention. Brake devices 1 are mounted on a fork 3 of a cycle. Each brake device 1 comprises a basic part 4 arranged pivotally on a shaft 5. This shaft 5 is fixedly connected to fork 3. Also arranged on shaft 5 is a first friction disc 6. A second friction disc 7 is further arranged for rotation on shaft 5. This second friction disc 7 is loaded by means of a cup spring 8. This cup spring 8 can be brought to tension by means of bush 9 and bolt 10.

Arranged in second disc 7 is a slot 11 into which extends a pin 12, which pin 12 is fixed to basic part 4.

Further arranged on basic part 4 is a brake block 13 which lies at a fixed distance S from wheel rim 14. Brake block 13 is fixed by means of bolt 15, washer 16 and nut 17.

The braking force required for braking is transmitted via bowden cable 18 to the ends 19 of basic parts 4. The two ends 19 of basic parts 4 are urged by means of a spring 34 into a rest position. Spring 34 is accommodated in cylinder 33 and can be compressed by piston 36, which is connected to rod 35.

The play in bowden cable 18 is equalized by means of adjusting device 2. A slidable ring 31 and spiral spring 22 are arranged on adjusting device 2, which spiral spring supports on adjusting device 2 via flange 21. This spiral spring 22 prevents the whole braking force being fully exerted on wheel rim 14 immediately the brake blocks 13 engage. Instead of spiral spring 22 another resilient element can also be provided, such as an elastomer. Owing to spring 22 the build-up of the braking force takes place gradually, whereby the braking force can be applied more easily.

Figure 2:
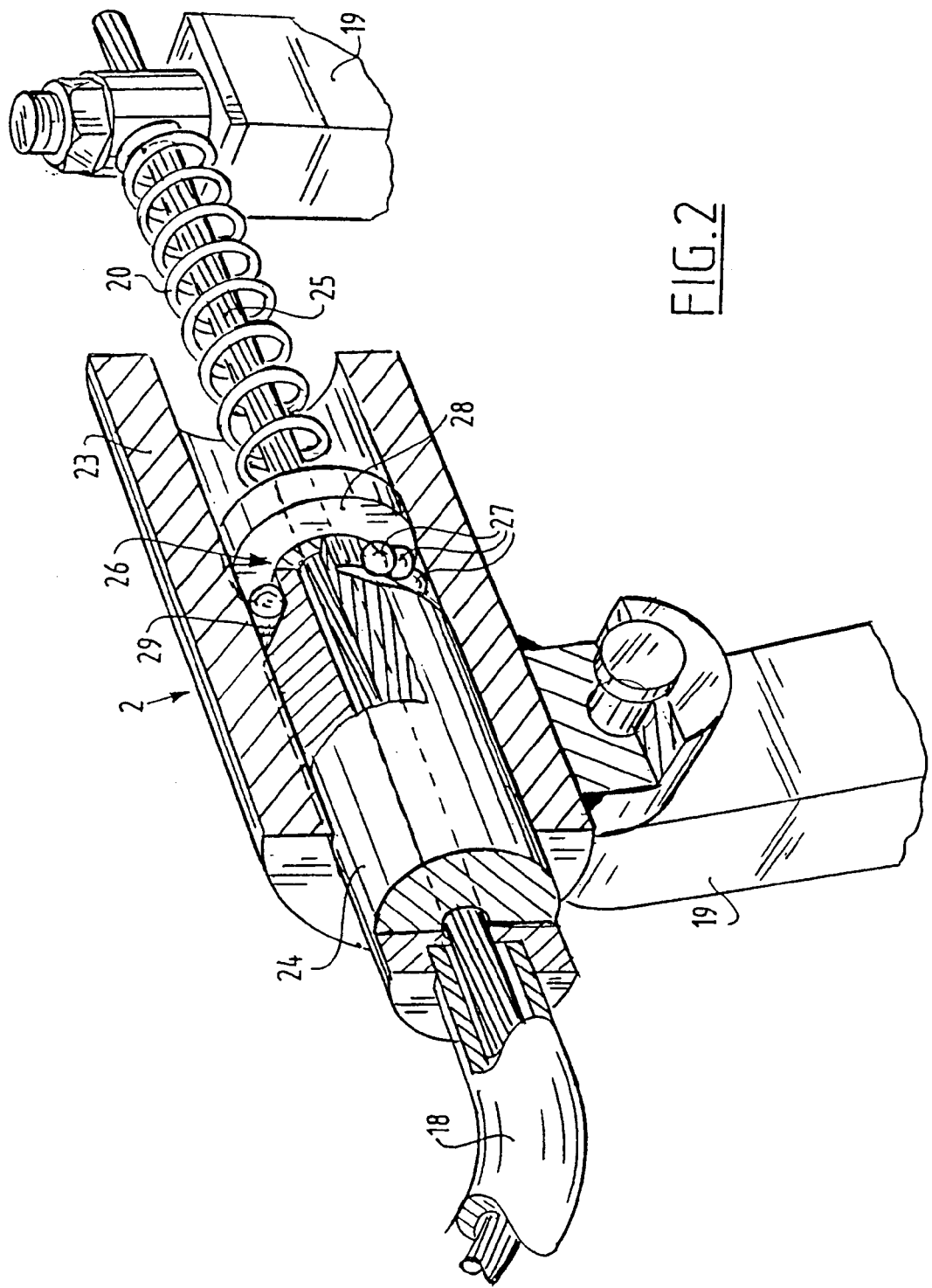
FIG. 2 shows a perspective view with partly cut-away parts of a further embodiment of the adjusting device according to the invention.

FIG. 2 shows a further embodiment of the adjusting device according to the invention. Adjusting device 2 comprises a cylindrical bush 23 which is fastened hingedly to the end 19 of a basic part. A second cylindrical part 24 is slidably arranged in this cylindrical bush 23 and the outside of bowden cable 18 supports on the outer end of this cylindrical part 24. The inner cable 25 of the bowden cable runs through this cylindrical part 24 and is fixed to the other end 19 of basic part 4. The cylindrical part 24 comprises a groove 26 in which a number of balls 27 are arranged. Groove 26 comprises a vertical surface 28 and an upward inclining surface 29. As soon as a braking force is exerted the balls 27 will ascend along the inclining surface 29 and be clamped between cylindrical bush 23 and cylindrical part 24. When play now occurs between the outer cable and inner cable of bowden cable 18, the spring 20 will then displace cylindrical part 24 in the cylindrical bush 23, whereby the play is eliminated. As soon as braking force is again exerted, the balls will once again fix cylindrical bush 23 relative to cylindrical part 24, wherein the brake device remains free of play.

Figure 3:
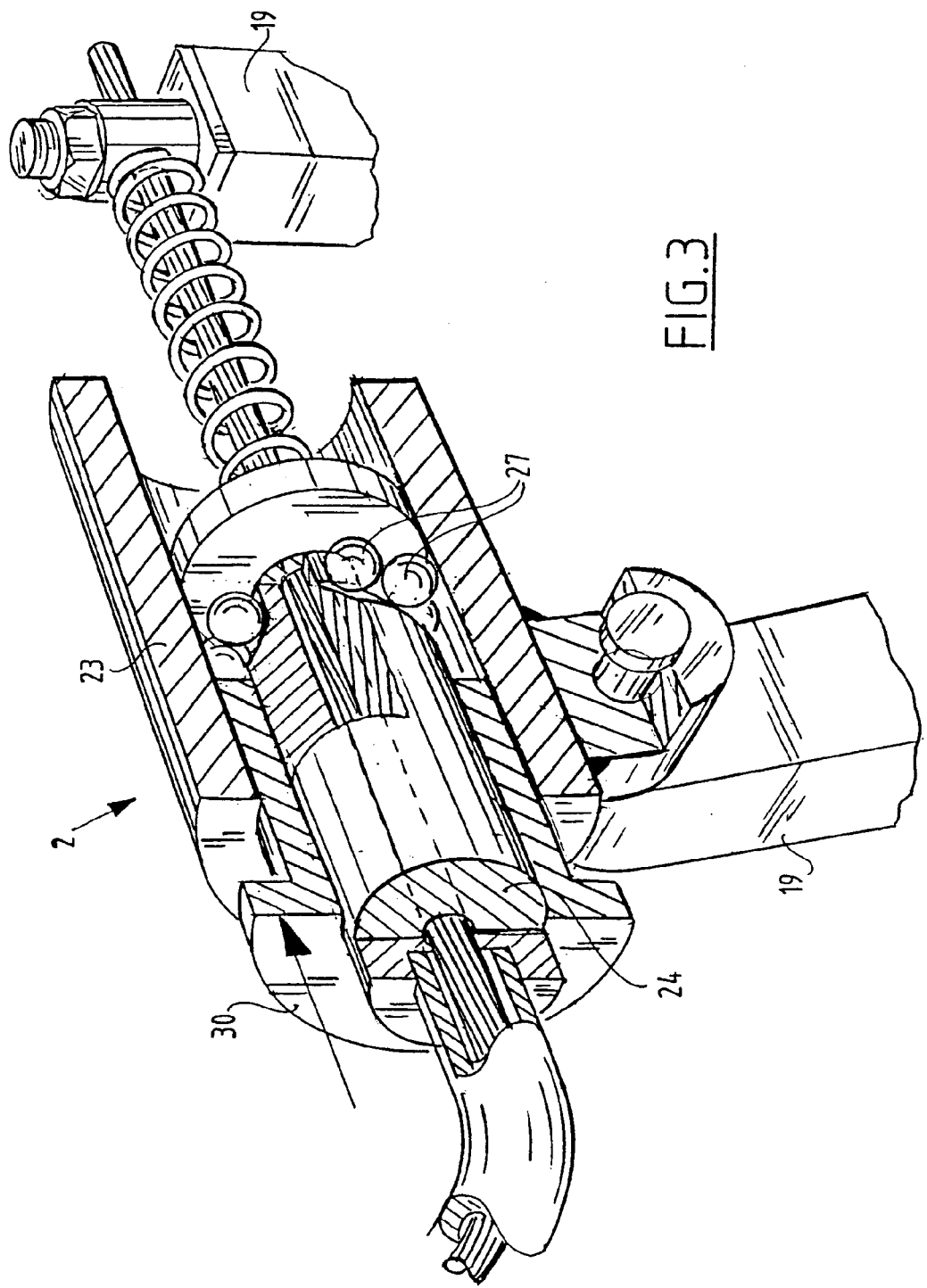
FIG. 3 shows a perspective view with cut-away parts of a still further embodiment of the adjusting device according to the invention.

FIG. 3 shows a still further embodiment of the adjusting device 2. This embodiment largely corresponds with the embodiment shown in FIG. 2. The difference is that a so-called reset bush 30 is arranged between cylindrical bush 23 and cylindrical part 24. With this reset bush 30 the clamping action of balls 27 can be discontinued, whereby for instance the ends 19 of basic parts 4 can be moved further apart in order for instance to replace brake blocks 13, or to enable easier changing of a wheel.

It will be evident that the invention is not limited to the shown embodiment and can also be applied to other types of brake.

What is claimed is:

1. A brake device for braking movement of an object by mechanical friction, such as the movement of rails relative to a train, or the rotation of a brake disc or a cycle wheel, which brake device comprises:

a basic part with an engagement point for engagement of a braking force which can be exerted via operating means;

a brake block arranged on the basic part for braking the movement of the object by friction, wherein the basic part is movable such that the brake block is movable with at least a substantial transverse component relative to the movement of the object;

resetting spring means for urging the brake block away from the object to a free rest position such that in the case of a braking force smaller than the spring force a space results between the object and the brake block;

a first friction part arranged slidably on the basic part;

a second friction part which is pressed under spring load against the first friction part, a first and a second stop, which stops are arranged at a fixed mutual distance, which first stop determines the maximum distance between the object and the brake block, and which second stop adjusts itself to the contact position, wherein the brake block and object make mutual contact when a braking force is exerted which exceeds the spring force, wherein both stops are connected to the second friction part.

2. The brake device as claimed in claim 1, wherein the friction parts are disc-shaped.

3. The brake device as claimed in claim 1, wherein both stops are formed as the end surface of a slot arranged in one of the second friction part and the basic part and a pin, which extends in the slot, is arranged on the other of the one of the basic part and the second friction part and co-acts with these respective end surfaces.

4. The brake device as claimed in claim 1, wherein the engagement point for engaging a braking force comprises a device for eliminating play between a bowden cable and the basic part, which device comprises:

a first cylindrical bush;

a second cylindrical bush placed slidably in the first cylindrical bush, to which the outer casing of the bowden cable is coupled so as to be resistant to compression and tensile strain and through which the inner cable runs, wherein the second bush comprises on the outside a recess which together with the first bush bounds a wedge-shaped space; and at least one ball placed in the wedge-shaped space for blocking by wedging action the sliding movement of the second bush relative to the first bush in an axial direction.

5. The brake device as claimed in claim 4, wherein the device for eliminating play comprises a third cylindrical bush placed slidably between the first and the second bush for engagement on the at least one ball, in order to discontinue the blocking action as desired.

6. A cycle brake for braking a wheel arranged rotatably in a fork, wherein the cycle brake is comprised of two brake devices, wherein each brake device comprises:

a basic part with an engagement point for engagement of a braking force which can be exerted via operating means;

a brake block arranged on the basic part for braking the movement of the wheel by friction, wherein the basic part is movable such that the brake block is movable with at least a substantial transverse component relative to the movement of the wheel;

resetting spring means for urging the brake block away from the wheel to a free rest position such that in the case of a braking force smaller than the spring force a space results between the wheel and the brake block;

a first friction part arranged slidably on the basic part;

a second friction part which is pressed under spring load against the first friction part, a first and a second stop, which stops are arranged at a fixed mutual distance, which first stop determines the maximum distance between the wheel and the brake block, and which second stop adjusts itself to the contact position, wherein the brake block and wheel make mutual contact when a braking force is exerted which exceeds the spring force, wherein both stops are connected to the second friction part, wherein each brake device is arranged on an arm of the fork on either side of the wheel, wherein the first and the second friction parts are arranged fixedly on the fork, wherein the brake block engages the cycle wheel, and wherein the resetting spring means are arranged between the basic parts.

* * * * *